United States Patent [19]
Wosnitza et al.

[11] Patent Number: 5,373,646
[45] Date of Patent: Dec. 20, 1994

[54] PROCESS AND APPARATUS FOR DRYING MATERIAL TO BE DRIED

[75] Inventors: Franz Wosnitza; Georg Zimmermann, both of Aachen, Germany

[73] Assignee: SICOWA Verfahrenstechnik fur Baustoffe GmbH & Co. KG, Aachen, Germany

[21] Appl. No.: 879,641

[22] Filed: May 7, 1992

[30] Foreign Application Priority Data

May 10, 1991 [DE] Germany ............... 4115408

[51] Int. Cl.$^5$ ............................................. F26B 3/34
[52] U.S. Cl. ................................. 34/256; 34/257; 34/412; 34/92
[58] Field of Search ............ 34/1 K, 1 L, 1 M, 1 N, 34/17, 15, 68, 5, 92, 255, 256, 257, 258, 245, 287, 289, 406, 408, 412, 418

[56] References Cited

U.S. PATENT DOCUMENTS

| | | | |
|---|---|---|---|
| 2,555,450 | 6/1951 | Lee | 34/1 M |
| 3,235,971 | 2/1966 | Tooby | 34/1 L |
| 4,222,176 | 9/1980 | Tjurin et al. | 34/1 K |
| 4,428,127 | 1/1984 | Grassmann | 34/1 L |
| 4,488,362 | 12/1984 | Grassmann | 34/1 L |
| 4,909,899 | 3/1990 | Kiiskila | |
| 5,172,487 | 12/1992 | Hansen et al. | 34/5 |

FOREIGN PATENT DOCUMENTS

| | | | |
|---|---|---|---|
| 0105174 | 4/1984 | European Pat. Off. | H05B 6/46 |
| 0408946 | 1/1991 | European Pat. Off. | A61L 2/12 |
| 3734281 | 4/1989 | Germany | C02F 11/12 |

*Primary Examiner*—Denise L. Gromada
*Attorney, Agent, or Firm*—Townsend and Townsend Khourie and Crew

[57] ABSTRACT

The invention relates to a process and an apparatus for drying sludge, in particular sewage sludge, or moist bulk material, wherein the material to be dried is heated by supplying energy by means of an electromagnetic alternating field generated between electrodes in a sealed pressurized vessel at an overpressure and the material moisture evaporated by the heating is used as heat transfer medium for heating the material to be dried in a step which is separate from the heating in the electromagnetic alternating field. In this process, the material to be dried is received with electrically insulated contiguous contact with the electrodes located in the pressurized vessel at least for a dwell time which is necessary for the heating and is then subjected to a flash drying.

35 Claims, 4 Drawing Sheets

PROCESS AND APPARATUS FOR DRYING MATERIAL TO BE DRIED

TECHNICAL FIELD

The invention relates to a process and an apparatus for drying material, such as sludge, in particular sewage sludge, or moist bulk materials, to be dried.

PRIOR ART

Sewage sludge originating from a mechanical preliminary dehydration is normally dried convectively in a contact, disk, circulating-air or fluidized-bed dryer or the like, the vapors produced in this process being discharged into the environment, and this results not only in the large energy loss associated therewith but in environmental pollution and odor nuisance.

DE-A-3 734 281 discloses the drying of sludge or moist bulk material by heating it in a reactor housing by means of an electromagnetic alternating field, in which drying the material moisture evaporated by the heating is used as heat transfer medium for heating the material to be dried in an upstream step separate from the heating in an electromagnetic alternating field. In this process, the material to be dehydrated and having a relatively high initial moisture content is transported in the reactor housing on a conveyor device through at least one high-frequency field and is dehydrated under these circumstances substantially to a residual moisture content, the dehydrated material is discharged, and the evaporated vapors obtained are used for preheating the material to be dried and then aftertreated. The conveyance of the material to be dried past and between the capacitor plates results in a very unfavorable energy utilization because of the large air gap located between the capacitor plates and the material to be dried and, in addition, it requires a high equipment cost for the vessel. In addition, the evaporation vapors condensed after this process result, as a rule, in a number of pollutants.

DISCLOSURE OF THE INVENTION

One object of the invention is to provide a process and an apparatus for drying material to be dried which function very favorably from the point of view of energy.

Accordingly, the process provides that the material to be dried is heated by supplying energy by means of an electromagnetic alternating field generated between electrodes in a sealed pressurized vessel at an appreciable overpressure and the material moisture evaporated by the heating is used as heat transfer medium for heating the material to be dried in a step which is separate from the heating in the electromagnetic alternating field, and the material to be dried is received by the pressurized vessel with electrically insulated contiguous contact with the electrodes located in the pressurized vessel at least for a dwell time which is necessary for the heating and is then subjected to a flash drying.

According to the invention, an apparatus for drying material to be dried is furthermore provided with a sealed through-type pressurized vessel for receiving the material to be dried, with an apparatus having electrodes disposed in the vessel and intended for heating the material to be dried by means of an electromagnetic alternating field and with an apparatus for heating the material to be dried by means for the material moisture produced by the heating in the alternating electromagnetic field in a step which is separate from the heating in the electromagnetic alternating field, wherein the through-type pressurized vessel, optionally ventilated at the inlet and outlet sides, is constructed with electrodes which are in electrically insulated contiguous contact with the material to be dried and there is a flash tank downstream of the vessel.

The contiguous contact of the material to be dried with electrodes insulated against electrical contact and the air space lacking in between achieves an improved utilization of the energy used in the heating, which utilization is further increased by the downstream flash drying which results in an additional increase in the dry matter content of the material. The flash drying is only possible because of the overpressure procedure involving appreciable overpressure in the pressurized vessel.

In this way, environmentally friendly electrical energy is used in order to heat the material to be dried inductively, or preferably dielectrically, in the (low-to high-frequency) electromagnetic alternating field. Under these circumstances, microwave drying, or in particular, drying in a high-frequency field, for example with frequencies of 13.56, 27.12 or 40.58 MHz can be carried out. The evaporated material moisture is used for convective and/or contact heating either for the purpose of predrying or for the purpose of afterdrying, in which connection two or more drying steps may optionally be arranged in series, or for drying in a contact or convention dryer arranged in parallel, thereby resulting in an energetically very favorable procedure.

The material to be dried passes through the through-type pressurized vessel in batches, quasi-continuously or continuously from bottom to top or from top to bottom with appropriate heating. Generally, an appreciable overpressure substantially greater than or equal to 2 bar, in particular a pressure of between 2 and 3 bar, is maintained in the pressurized vessel.

The temperature of the material to be dried is expediently kept below 150° C. at least during the convective heating in order that essentially only steam is produced during said heating and essentially no degassing of the material to be heated occurs, with the result that, ultimately, as small amounts as possible of environmentally pollutant exhaust gases are discharged. Preferably, the material to be dried is kept below 150° C. during the entire drying operation, but heating can also be carried out to over 150° C. during the heating in the electromagnetic alternating field, the evaporated material moisture can be condensed during or after the further use and the condensate can be discharged into the waste water, with the result that even then essentially no environmentally pollutant emissions to the environmental air take place.

Between the stage of heating in the electromagnetic alternating field and the further stage of heating operated with the vapors from the latter, a sludge temperature difference of greater than or equal to 25° C. is expediently employed, i.e. the material to be dried in the electromagnetic alternating field is at a temperature at least 25° C. higher than in the vapor-heated drying stage.

Further objects and developments of the invention are to be found in the subclaims and the description below.

BRIEF DESCRIPTION OF THE DRAWINGS

The invention is explained in greater detail below by reference to exemplary embodiments shown in the accompanying figures.

EXEMPLARY EMBODIMENT OF THE INVENTION

Figure 1:
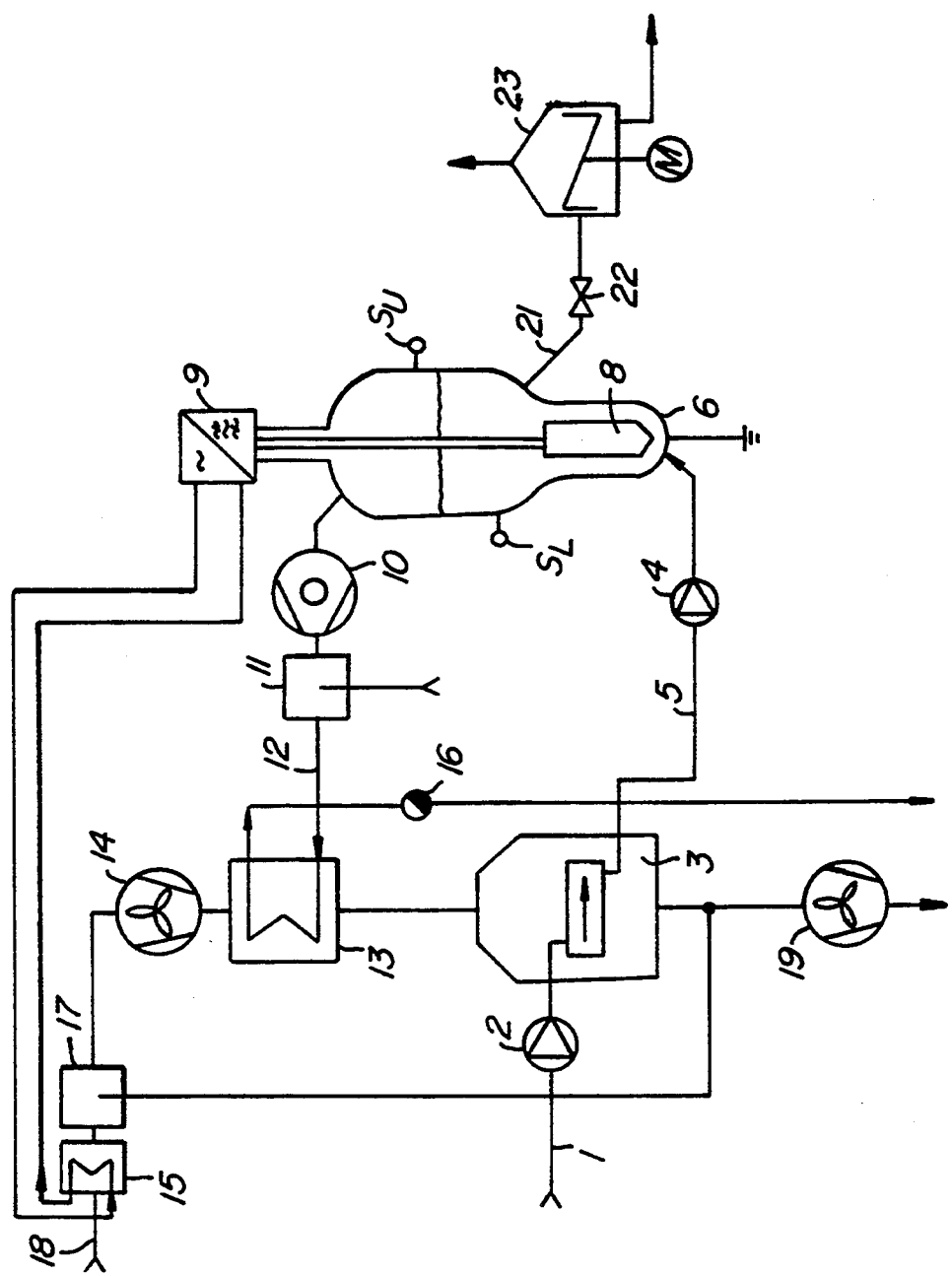
FIG. 1 shows a schematic of the first embodiment of the invention.

In the embodiment shown in FIG. 1, sewage sludge originating from a mechanical preliminary dehydration is fed via a pipe 1, for instance by means of a sludge pump 2, to a circulating-air predryer 3 and from there it passes, also for example via a sludge pump 4 and a pipe 5, without entrained air into a sealed pressurized vessel between two electrodes 8 which are immersed in the sewage sludge and act as capacitor plates electrically insulated from the sewage sludge and from each other and which are connected to a high-frequency generator 9 operated with electrical primary energy in order to be dielectrically heated therein.

In the pressurized vessel 6, the sewage sludge, preheated in the circulating-air dryer 3, is heated under pressure to a temperature preferably below 150° C. The vapors produced in this process are fed to a vapor turbo-compressor which compresses the vapors and delivers them to an injection cooler 11 to which cooling water is fed to reduce the superheat temperature of the compressed vapors and at the same time to generate further steam via a pipe 12. From the injection cooler 11, the steam passes to a heat exchanger 13 for heating circulating air fed to the heat exchanger 13 by means of a circulating-air fan 14.

In addition, the heat generated by the high-frequency generator 9 is fed via a cooling circuit (water heated to about 60° to 70° C. on the feed side) to a heat exchanger 15 to preheat circulating air in order also to utilize this waste heat for heating circulating air.

The air heated by the heat exchanger 13 is fed to the circulating-air predryer 3, while the vapor condensate generated in the heat exchanger 13 is discharged into the waste water via an interceptor 16.

Cooled circulating air from the circulating-air predryer 3 is at least partially fed to a premixer 17 to which preheated cold air can, in addition, be fed via a pipe 18. Furthermore, a waste-air fan 19 is provided for partially discharging circulating air into the environment. Since the temperature of the circulating air used for predrying is kept commensurately low, i.e. in the region of, for example, approximately 110° C., only vapors which essentially contain steam and which can be discharged into the environment without further ado are thereby generated.

Since the vapors from the pressurized vessel 6 cannot be discharged into the environment but are encountered as condensate on leaving the heat exchanger 13 (and optionally after further cooling), the heating in the pressurized vessel 6 may also be carried out at above 150° C.

Figure 2:
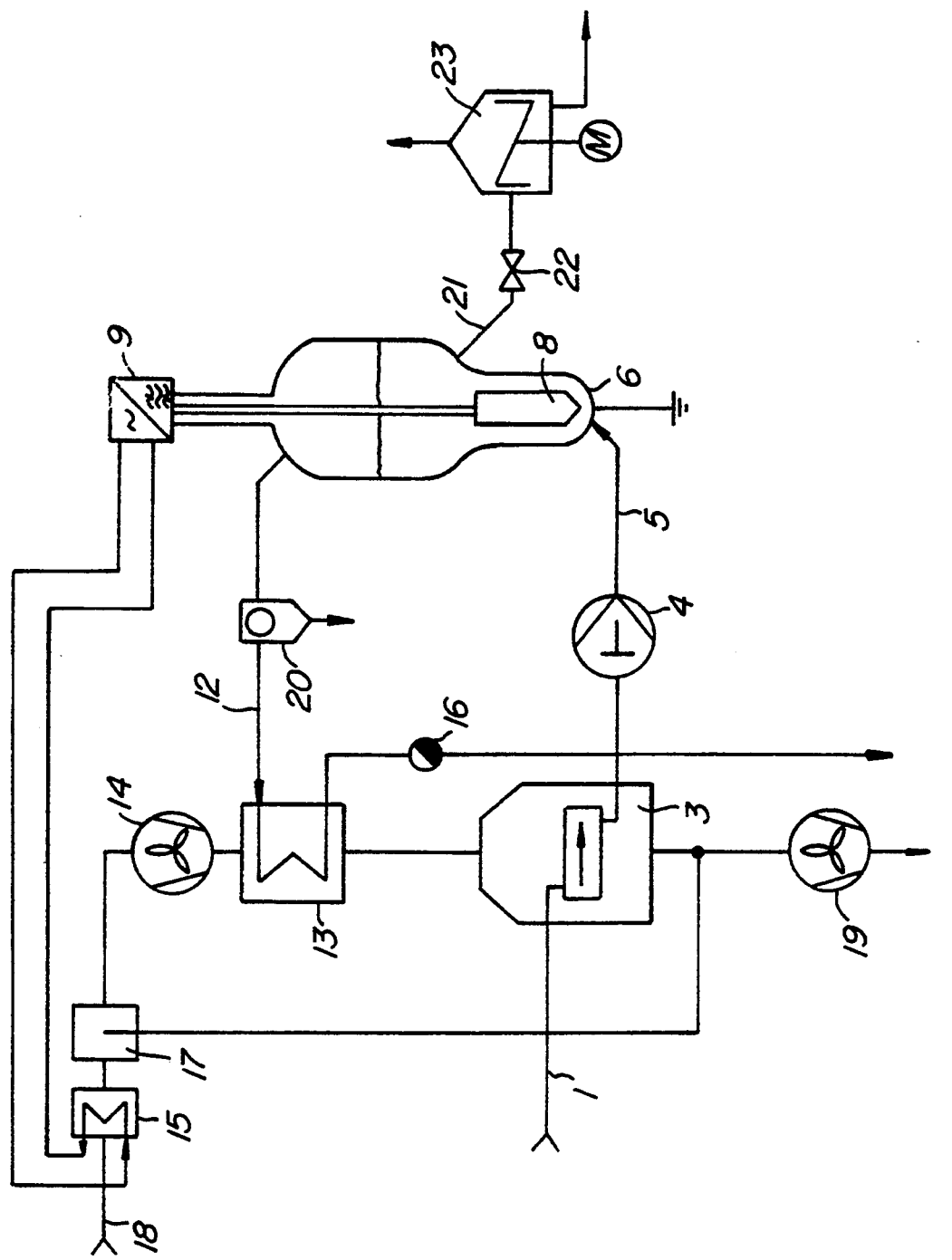
FIG. 2 shows a second embodiment of the invention.

In the embodiment shown in FIG. 2, the preheated sewage sludge coming from the circulating-air dryer 3 is pumped into the pressurized vessel 6 and is heated dielectrically in a high-frequency field by means of electrodes 8 immersed in the sewage sludge and electrically insulated from the latter. The vapors produced in this process have a pressure of, for example, 2 to 3 bar, with the result that they are essentially composed of pure steam (since the vapors are later condensed, higher pressures, and consequently temperatures higher than 150° C., can also be used). In this case, the vapors are fed to the heat exchanger 13 via a water trap 20.

The heated sewage sludge from the pressurized vessel 6 is fed in the two embodiments described above via a pipe 21 having a valve 22, which serves as pressure seal on the discharge side (the pressure seal on the inlet side is the sludge pump 4), to a flash tank 23. As a consequence of the flash on entering the flash tank 23, flash drying takes place, as a result of which the water content of the sewage sludge is again reduced substantially. In addition, the flashing in the flash tank 23 advantageously effects a formation of powdered or granular material, or at least a disintegration of the material to be dried. The discharge from the flash tank 23 is carried out, for example, by means of a conveyor screw.

Water vapor produced in this process may optionally also be used to preheat the sewage sludge before it enters the circulating-air predryer 3.

The upwardly directly vapor outlet of the pressurized vessel 6 causes continuously heated and dried sewage sludge to be produced in the pressurized vessel 6, which sewage sludge builds up from the bottom to the top. A batchwise discharge of the dried sewage sludge from the pressurized vessel 6 to the flash tank 23 can be carried out by suitably controlled opening of the valve 22 by means of two level sensors $S_L$ and $S_U$, which are disposed above the electrodes 8 by opening the valve 22 when the level of the sewage sludge reaches the upper level sensor $S_U$ and closing the valve 22 again when the level of the sewage sludge reaches the lower level sensor $S_L$ which is essentially adjacent to the level of the outlet opening to the pipe 21. When the valve 22 is open, the pressure in the pressurized vessel 6 forces the sewage sludge out. Under these circumstances, the sewage sludge can be continuously fed into the pressurized vessel 6. (Alternatively, however, the sewage sludge can also be fed in and discharged discontinuously). If an energy transfer which is sufficient for the heating envisaged in the pressurized vessel 6 is achieved, a continuous feeding-in and discharge of the material to be dried is also possible, with the result that no level sensors are necessary and the valve 22 essentially fulfills a safety role.

Figure 3:
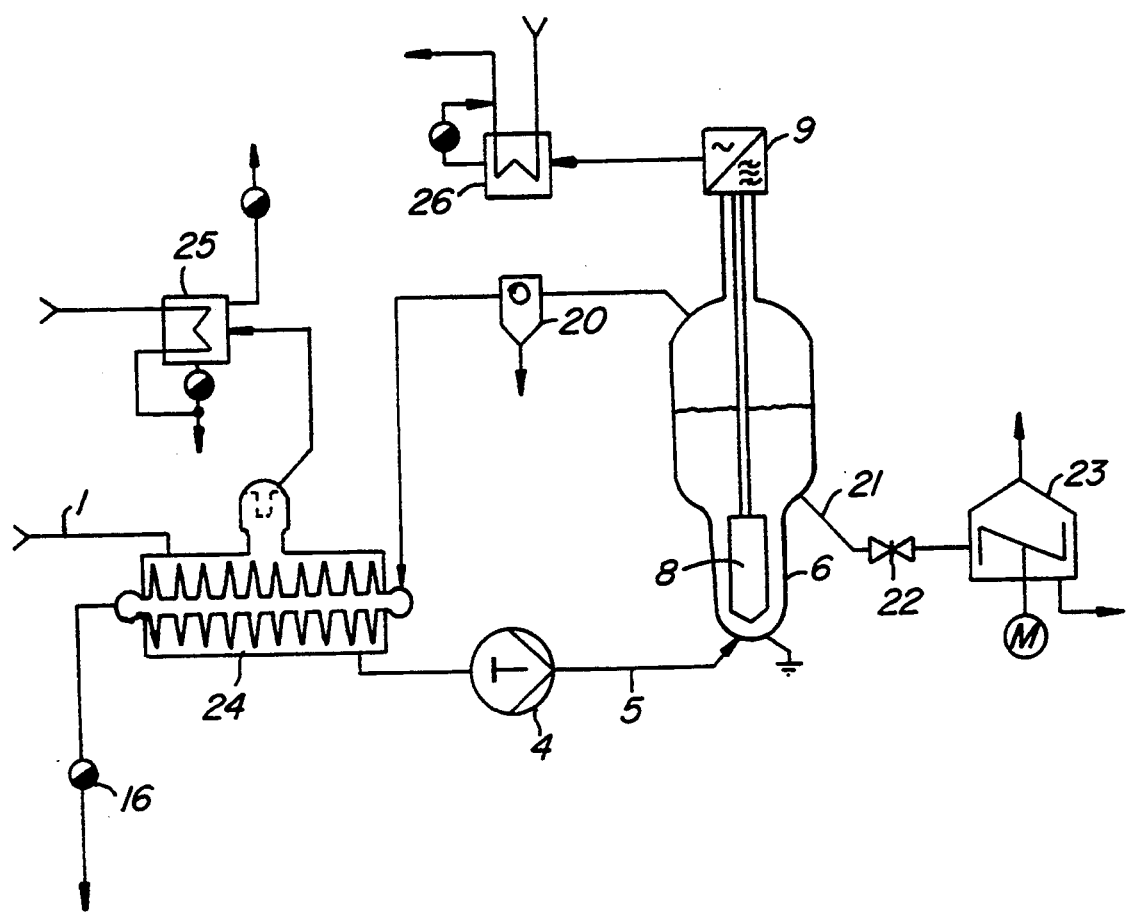
FIG. 3 shows a third embodiment of the invention.

In the embodiment shown in FIG. 3, the steam generated in the pressurized vessel 6 is fed directly, i.e. without a gaseous intermediate circuit, into a sludge predryer 24 (a contact or convection predryer) to preheat the sewage sludge. The condensate produced by cooling the steam is discharged into the waste water. Vapors produced in the sludge predryer 24 by the preheating are cooled in a vapor condenser 25 by means of cooling water and discharged, together with the latter, as condensate into the waste water, resulting in a gas emission which is at most slight. The high-frequency generator 9 is cooled by circulated coolant which is in turn cooled by fresh cooling water in a heat exchanger 26.

Figure 4:
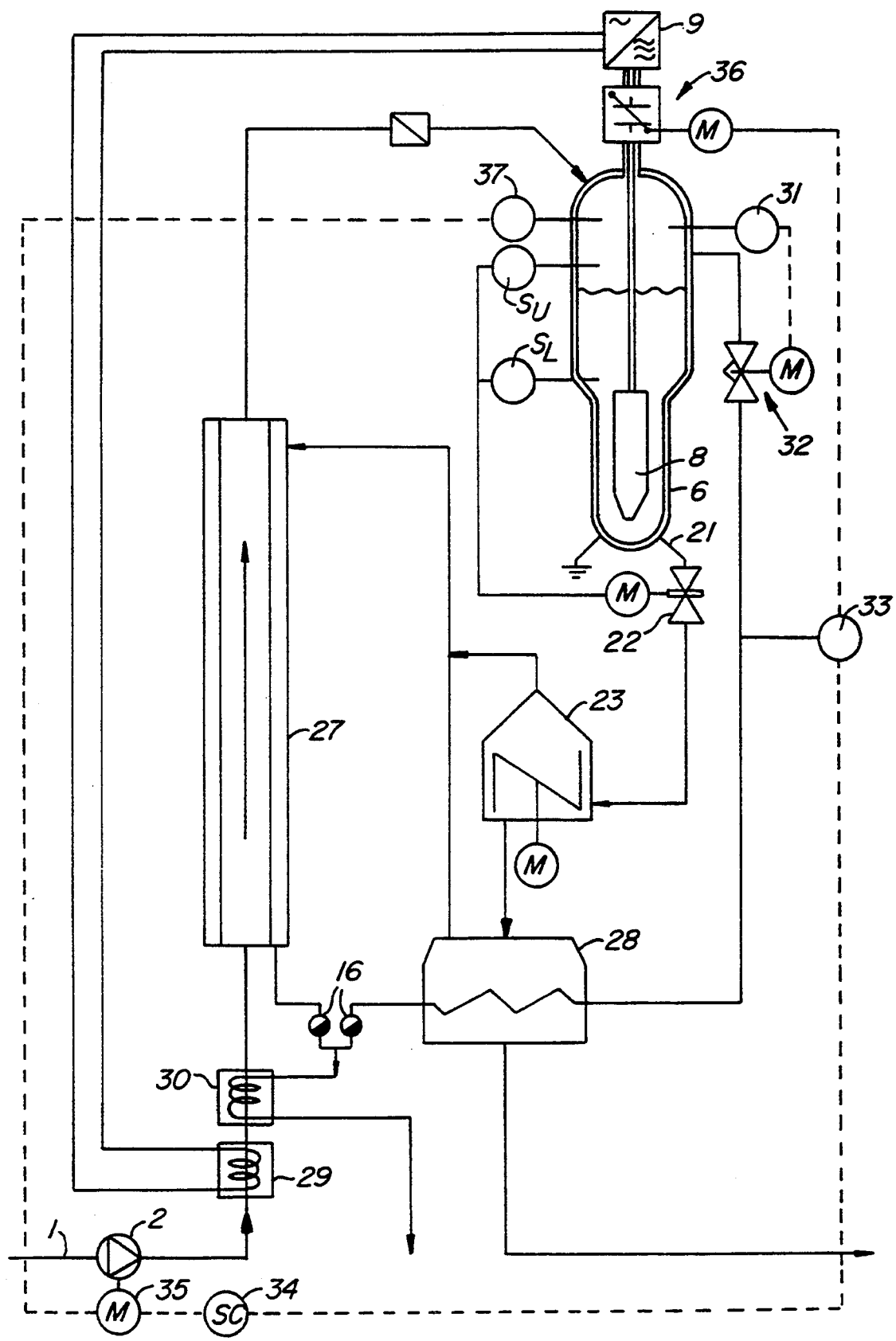
FIG. 4 shows a fourth embodiment.

In the embodiment shown in FIG. 4, the sewage sludge is conveyed via the pump 2 into a preheater 27, which is, for example, a double-casing pipe or the like, optionally having a conveyor screw for the sewage sludge and is disposed, in particular, vertically, with the result that the sewage sludge is conveyed upwards through the preheater 27 via a pipe having a shutoff valve into the pressurized vessel 6 in order to be heated further therein, for example, to somewhat below 150° C. by means of electrical primary energy. From the pressurized vessel 6, the sewage sludge passes into the flash tank 23, the steam released in the latter being fed to the preheater 27 to preheat the sewage sludge. The steam formed in the pressurized vessel 6 is fed to a convective or contact afterdryer 28, for example a disk or contact dryer, to which the sewage sludge, predried to this extent, is fed from the flash tank 23 and the vapors generated in said afterdryer 28 are fed to the preheater 27, together with those from the flash tank 23. (The waste heat of the high-frequency generator 9 and the condensate waste heat can be used for initially preheating the sewage sludge by means of heat exchangers 9, 30 disposed upstream of the preheater 27).

The pressure inside the pressure vessel 6 can be monitored in all the embodiments described above by means of a pressure sensor 31 which controls a valve 32 in the pipe from the pressurized vessel 6 to the afterdryer 28, with the result that the pressure in the pressurized vessel 6 is kept constant. The flow rate of the drying vapor from the pressurized vessel 6 to the afterdryer 28 may furthermore be measured by a sensor 33 and an overall regulation of the mass flow (which is adjusted by a motor 35, controlled by a control element 34, for the pump 2) and the output of the high-frequency generator 9 (controlled by means of an adapter 36) can thus be carried out in such a way as to result in a constant drying rate and, consequently, if the dry matter content of the sewage sludge fed in is constant, also in a constant dry matter content after drying. In addition, a maximum level sensor 37 whose response results in the motor 35 of the pump 2 being switched off may be provided.

The high-frequency voltage may be fed in, preferably, in a balanced manner with respect to ground potential or, alternatively, in an unbalanced manner.

In the pressurized vessel 6, the electrodes 8 immersed in the sewage sludge are completely encapsulated and arranged, for example, in a sheath of electrically insulating ceramic material such as $Al_2O_3$ and are supported, for example, by ceramic bodies.

One electrode 8 may be formed by the wall of the pressurized vessel 6, in which there is a centrally disposed, rod-type electrode 8 in order to form an annular capacitor. The annular electrode 8 may, however, also be disposed at a distance from the wall of the pressurized vessel 6, in which case the sewage sludge is pumped from below into the region of the annular electrode and overflows at its top rim into the annular space between the wall of the pressurized vessel and the outside of the annular electrode 8 in order to be continuously discharged from that point. Alternatively, the sewage sludge can be discharged in batches by means of a level regulator.

Incidentally, the pressurized vessel 6 can be disposed in a space-saving manner above the predryer 3 or preheater 27 or the afterdryer 28 with the flash tank 23 being arranged in between.

We claim:

1. A process for drying material to be dried, wherein the material to be dried is heated by supplying energy by means of an electromagnetic alternating field generated between electrodes in a sealed pressurized vessel and the material moisture evaporated by the heating is used as heat transfer medium for heating the material to be dried in a step which is separate from the heating in the electromagnetic alternating field, and wherein the material to be dried is received by the pressurized vessel with electrically insulated contiguous contact with the electrodes located in the pressurized vessel at least for a dwell time which is necessary for the heating and is then subjected to a flash drying.

2. The process as claimed in claim 1 wherein the temperature of the material to be dried is kept below 150° C. at least during heating.

3. The process as claimed in claim 1 wherein the heating is carried out convectively.

4. The process as claimed in claim 1 wherein the material to be dried is heated to at least about 25° C. higher in the electromagnetic alternating field than in any of the other heating stages employing the evaporated material moisture.

5. The process as claimed in claim 4 wherein the heating in the pressurized vessel is carried out under a pressure of 2 to 3 bar.

6. The process as claimed in claim 5 wherein steam produced during flashing of the material to be dried after discharge from the pressurized vessel is further used to heat the material to be dried.

7. The process as claimed in claim 6 wherein the heating in the pressurized vessel is carried out dielectrically by means of a high-frequency field.

8. The process as claimed in claim 7 wherein the heat generated during the generation of the high-frequency field is used to preheat circulating air which is used to heat the material to be dried.

9. The process as claimed in claim 8 wherein the evaporated material moisture is brought into heat exchange with the heated material discharged from the sealed pressurized vessel.

10. The process as claimed in claim 8 wherein the evaporated material moisture is used to heat air which in turn convectively heats the material to be dried.

11. The process as claimed in claim 10 wherein the flash drying is controlled by a level measurement of the material to be dried in the pressurized vessel.

12. The process as claimed in claim 11 wherein a flow rate of the vapors from the pressurized vessel is used to control a mass flow of the material to be dried into the pressurized vessel and the power to generate the electromagnetic alternating field.

13. An apparatus for drying material to be dried, comprising a sealed through-type pressurized vessel for receiving the material to be dried, means for heating the material to be dried by means of an electromagnetic alternating field by means of electrodes disposed in the vessel and means for heating the material to be dried by means of the material moisture generated by the heating in the electromagnetic alternating field in a step which is separate from the heating in the electromagnetic alternating field, wherein the vessel is constructed with electrodes which are in electrically insulated contiguous contact with the material to be dried and there is a flash tank downstream of the pressurized vessel.

14. The apparatus as claimed in claim 13 wherein at least one dryer is provided which can be operated, without a gaseous intermediate circuit, using the vapors produced in the pressurized vessel as heat transfer medium in such a way that the material to be dried does not exceed a temperature of 150° C. in said dryer.

15. The apparatus as claimed in claim 14 wherein the means for heating in the electromagnetic alternating field comprises two capacitor plates which are outwardly insulated and are connected to a high-frequency generator.

16. The apparatus as claimed in claim 15 wherein the electrodes form a vertical coaxial capacitor.

17. The apparatus as claimed in claim 16 wherein the feed pipe for the pressurized vessel discharges at the bottom inside the region of the vertical coaxial capacitor.

18. The apparatus as claimed in claim 17 wherein the high-frequency voltage of the high-frequency generator can be applied to the electrodes in a balanced manner with respect to ground potential.

19. The apparatus as claimed in claim 18 wherein the pressurized vessel with flash tank disposed underneath is disposed above the dryer.

20. The apparatus as claimed in claim 19 wherein a preheater for the material to be dried is arranged upstream of the pressurized vessel and is fed with vapors from dryers arranged downstream of the pressurized vessel as heat transfer medium.

21. The process as claimed in claim 1 wherein the heating is carried out by contact.

22. The process as claimed in claim 1 wherein the heating is carried out convectively and by contact.

23. The apparatus as claimed in claim 19 wherein the dryer is a contact dryer.

24. The apparatus as claimed in claim 19 wherein the dryer is a convection dryer.

25. The apparatus as claimed in claims 23 and 24 wherein a preheater for the material to be dried is arranged upstream of the pressurized vessel and is fed with vapors from dryers arranged downstream of the pressurized vessel as heat transfer medium.

26. The apparatus as claimed in claim 13 wherein at least one dryer is provided which can be operated, with a gaseous intermediate circuit, using the vapors produced in the pressurized vessel as heat transfer medium in such a way that the material to be dried does not exceed a temperature of 150° C. in said dryer.

27. The apparatus as claimed in claim 26 wherein the means for heating in the electromagnetic alternating field comprises two capacitor plates which are outwardly insulated and are connected to a high-frequency generator.

28. The apparatus as claimed in claim 27 wherein the electrodes form a vertical coaxial capacitor.

29. The apparatus as claimed in claim 28 wherein the feed pipe for the pressurized vessel discharges at the bottom inside the region of the vertical coaxial capacitor.

30. The apparatus as claimed in claim 29 wherein the high-frequency voltage of the high-frequency generator can be applied to the electrodes in a balanced manner with respect to ground potential.

31. The apparatus as claimed in claim 30 wherein the pressurized vessel with flash tank disposed underneath is disposed above the dryer.

32. The apparatus as claimed in claim 31 wherein a preheater for the material to be dried is arranged upstream of the pressurized vessel and is fed with vapors from dryers arranged downstream of the pressurized vessel as heat transfer medium.

33. The apparatus as claimed in claim 31 wherein the dryer is a contact dryer.

34. The apparatus as claimed in claim 31 wherein the dryer is a convection dryer.

35. The apparatus as claimed in claims 33 and 34 wherein a preheater for the material to be dried is arranged upstream of the pressurized vessel and is fed with vapors from dryers arranged downstream of the pressurized vessel as heat transfer medium.

* * * * *